April 15, 1952     F. ADAMO     2,593,083
BUTTON LOOP FORMING MECHANISM
Filed April 28, 1947     2 SHEETS—SHEET 1
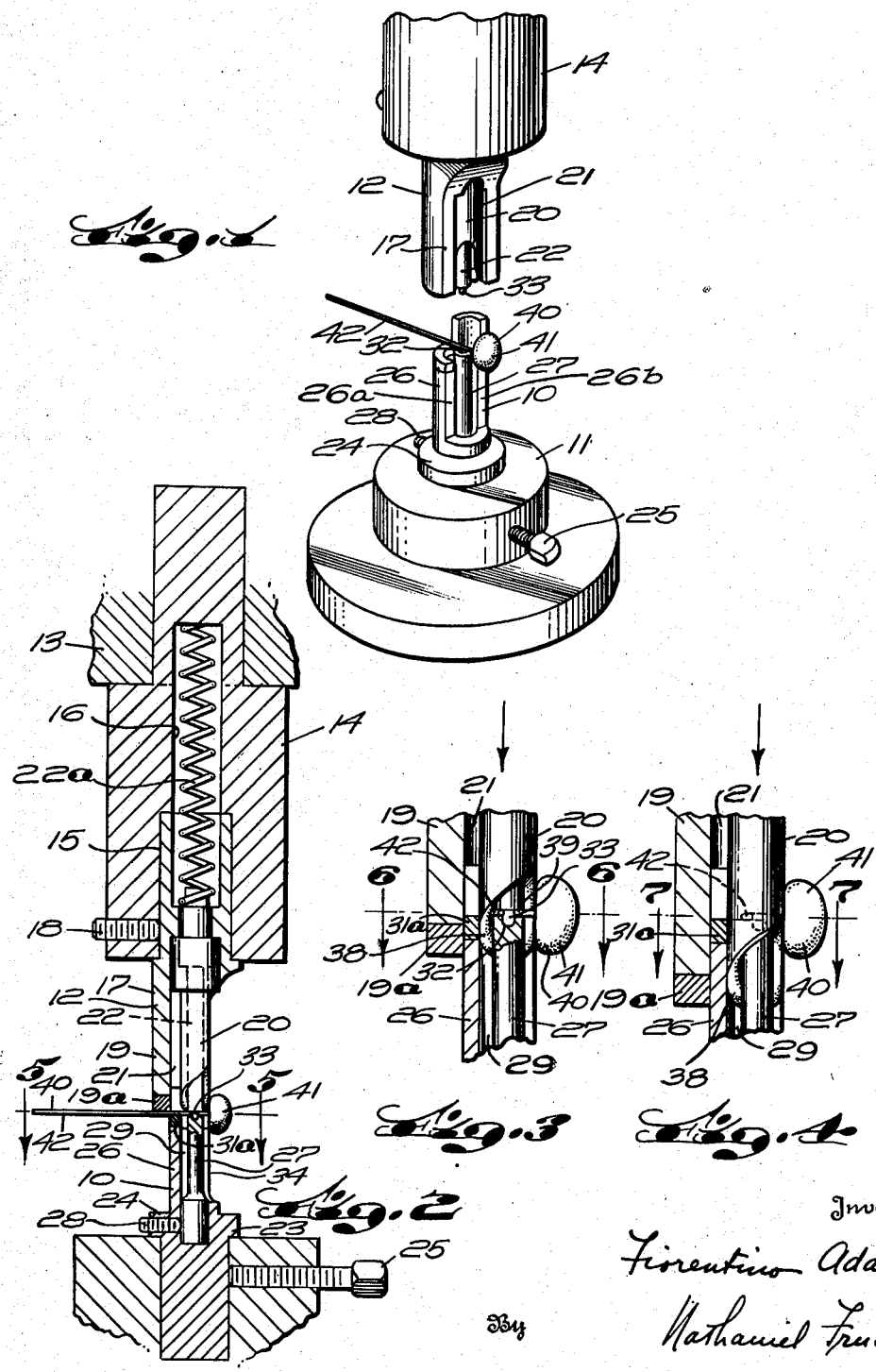

April 15, 1952 F. ADAMO 2,593,083
BUTTON LOOP FORMING MECHANISM
Filed April 28, 1947 2 SHEETS—SHEET 2
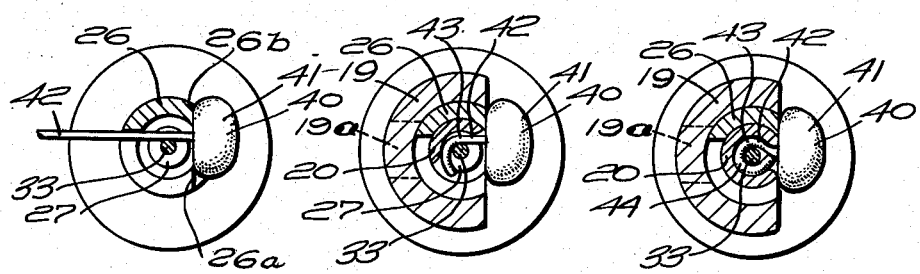
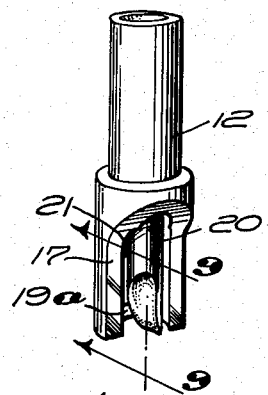
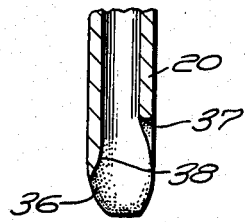
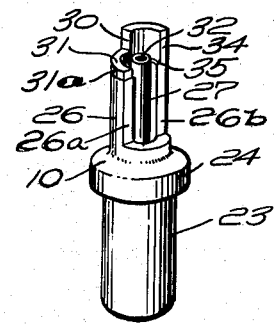
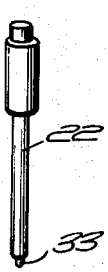
Inventor
Fiorentino Adamo
By Nathaniel Frucht
Attorney Patented Apr. 15, 1952

2,593,083

UNITED STATES PATENT OFFICE 2,593,083

BUTTON LOOP FORMING MECHANISM

Fiorentino Adamo, Providence, R. I., assignor to Oriental Glass & Novelty Company, Inc., a corporation of Rhode Island Application April 28, 1947, Serial No. 744,459

8 Claims. (Cl. 79—2)

The present invention relates to the manufacture of ornamental buttons, and has particular reference to a novel mechanism for forming a retaining loop on buttons of the molded and dipped type.

The manufacture of molded or dipped buttons includes the step of molding or dipping the button body on a metal support wire, the support wire then being cut to the proper length and bent or shaped to form a retaining loop for the button. The invention relates to mechanism for automatically cutting the support wire to the proper length and then shaping the retained support wire into loop form.

The principal object of the invention is to provide a press type mechanism which receives a button and its support wire, and cuts and shapes the support wire to form the button loop.

A further object of the invention is to provide a novel combination cutting and shaping die.

Another object of the invention is to provide a press type cutting and shaping mechanism which has its parts arranged to prevent accidental or inadvertent cutting of the operator's hands.

An additional object is to provide a novel cutting and shaping mechanism which is automatically centered during use.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 1 is a perspective view of the novel mechanism, the cutting and shaping die being lifted away from the base die to disclose the shapes thereof;

Fig. 2 is a vertical section through the mechanism of Fig. 1, the parts being shown in operating position for the cutting step;

Fig. 3 is an enlarged sectional detail showing the position of the operating parts in a later stage;

Fig. 4 is a view similar to Fig. 3, showing the operating parts at a still later stage;

Figs. 5, 6 and 7 are enlarged sectional details on the lines 5—5, 6—6 and 7—7 of Figs. 2, 3 and 4, showing the relative positions of the cutting and shaping elements and the loop wire at the various operating stages;

Fig. 8 is an enlarged perspective view of the cutting and shaping die;

Fig. 9 is a vertical section through the shaping plunger on the line 9—9 of Fig. 8;

Fig. 10 is an enlarged perspective view of the base die;

Fig. 11 is a perspective view of the centering pin of the cutting and shaping die; and Fig. 12 is a perspective view of a completed button, the inner end of the loop being shown in dotted lines.

It has been found desirable to provide a simple mechanism for cutting and shaping a button support wire into a retaining loop, thus ensuring uniformity of the looped buttons and eliminating hand shaping. To this end, I form a base die to receive and gauge a button support wire blank, and to cooperate with a cutting and shaping die, the latter die having a cam type shaping plunger and cooperating with the base die to cut the support wire to a predetermined button loop length and to shape the button loop length into a loop. I further arrange the parts to obtain continual alignment and centering, and to partially separate for receiving the button support wires, whereby insertion of the operator's fingers between the dies is prevented.

Referring to the drawings, the novel loop forming mechanism includes a base die 10 which is adapted to be secured to the bed plate 11 of a punch press of standard type, and a reciprocating die 12 which is mounted in the reciprocating head 13 of a punch press and is adapted to be periodically manually released for engagement with the base die. The reciprocating die 12 includes a block 14, shaped to be set into the head 13, and having a lower cylindrical recess 15 and an upper extended radially aligned bore 16. The recess 15 receives a forming tool 17 which is locked therein by a set screw 18, the forming tool having a partial outer cutting shell 19 of semi-cylindrical form, a shaping plunger 20 in fixed centrally concentric spaced relation thereto to provide an annular channel 21, and a movable centering pin 22 which is slidably mounted in the shaping plunger 20 and is spring pressed downwardly by a compression spring 22a which is seated in the bore 16 and is locked to the centering pin 22 at its lower end.

The base die 10, see Fig. 10, includes a body block 23 provided with a flange 24, and locked to the bed plate 11, as by a set screw 25; a partial outer shell 26 of semi-cylindrical form, having flattened vertically upward extending sides 26a and 26b which are in the same plane and provide a button head stop surface, extends upwardly from the body block 23 to seat within the annular channel 21 of the die 12, and a centering rod 27 is axially locked in spaced concentric relation thereto by means of a set screw 28 to provide an annular channel 29 into which the shaping plunger 20 may extend. The partial outer shell 26 is cut away at one side 30 at its upper portion to provide a stepped cutting shelf 31, and the upper end of the centering rod 27 is also preferably aligned with the shelf 31 and has a central cupped depression 32 adapted to receive the lower stepped end 33 of the centering pin 22. The other side 34 of the partial outer shell 26 has a slight cut back 35, positioned just below the shelf 31. The outer cutting shell 19 and the cutting shelf 31 have hardened inserts 19a and 31a for cooperating cutting action.

The shaping plunger 20 has a cam shaped edge 36, the edge having a transverse wire engaging portion 37, see Fig. 9, and a spiral shaping portion 38, see Figs. 2, 3 and 4. The shaping portion 38 is tapered back, as disclosed in Fig. 9, and the two dies are normally set to assume the initial position shown in Fig. 2, with a slight vertical clearance which in conjunction with the lower stepped end 33 of the centering pin forms an annular horizontal recess 39 between the aligned ends of the centering pin and the centering rod, both shells being positioned at the left of center of the mechanism, as shown in Fig. 1. The initial clearance is set to correspond to the thickness of the bottom support wire.

Referring to Fig. 2, a button blank 40 which has a button 41 and a support wire 42 extending therefrom, is placed in the mechanism by inserting the wire through the cut back 35 in the side 34 of the partial outer shell 26 of the base die. In this position, the wire extends through the annular recess 39 to one side of the centering rod 27 and seats on the stepped cutting shelf 31, the side 34 being contacted by the button body and acting as a stop to set the wire into proper length and cutting position. It will be noted that the upper portion of the partial outer shell 26 extends into the annular channel 21, and the lower stepped end 33 of the centering pin 22 is seated in the cupped depression 32 at the upper end of the centering rod 27, to keep the die parts in axial alignment, and that there is not sufficient space between the dies to permit insertion of a finger therebetween.

The press head is now actuated to reciprocate the die 12 downwardly in known manner. The cutting outer shell 19 of the forming tool 17 now severs the support wire 42 at the point where it rests on the shelf 31, thus providing a wire length 43 of the proper length, with its severed end in the recess 39, see Fig. 3; as the shaping plunger descends, its edge portion 37 engages the severed end of the wire length 43 and the spiral shaping portion 38 then forces it into the recess 39 around the stepped lower end 33 of the centering pin 22, the final shaping including an inward bend which completes the curling of the wire length 43 into a loop 44, see Fig. 7. As the reciprocating die descends, the spring pressure on the centering pin is increased to maintain the recess 39 while the wire end is looped. The term "loop" includes both a full loop or a partial loop such as a half or three-quarter loop, as these may be formed in the same manner by proportioning the loop-forming parts of the dies.

While I have described a specific embodiment of the invention, it is obvious that changes in the size, shape and proportions of the parts may be made to suit the requirements for different button loop forming mechanisms, without departing from the spirit and the scope of the invention as defined in the appended claims.

I claim:

1. In a button loop forming mechanism, vertically aligned relatively fixed and movable die elements, shelf means for positioning a button having a straight shank wire on said fixed die element, including a laterally disposed stop for the button body, said movable die element including an arcuate shell having a horizontally positioned cutter edge and a shaping plunger in said shell having a helical shaping edge, and a spring pressed centering pin slidably mounted in said plunger.

2. A cutting and shaping vertically movable die element for a button loop forming mechanism, comprising a cutter element including an arcuate shell having a horizontally disposed cutting edge, a hollow plunger in said shell having a helical forming edge spaced from said arcuate shell, a centering pin slidably mounted in said plunger, and spring means in said cutter element urging said centering pin downwardly in said plunger.

3. A vertically disposed fixed die for a button loop forming mechanism comprising an arcuate shell and a centering rod therein in spaced relation to the shell, said shell being cut away at one side to provide a horizontal cutting shelf, and being cut away in spaced relation to the cutting shelf to provide a vertically disposed button body stop.

4. A vertically disposed fixed die for a button loop forming mechanism comprising an arcuate shell and a centering rod therein in spaced relation to the shell, said shell being cut away at one side to provide a horizontal cutting shelf, and being cut away in spaced relation to the cutting shelf to provide a vertically disposed button body stop, and a horizontal aligning portion in alignment with the cutting shelf, whereby a button body and its straight wire shank may be positioned in place by threading the wire between the centering rod and the shell and over the aligning portion and the cutting shelf to engage the button body with the button body stop.

5. A button loop forming mechanism, comprising vertically aligned relatively fixed and movable die elements, shelf means for positioning a button having a straight shank wire extending therefrom on said fixed die element, said positioning means including a laterally disposed stop for the button body, means on said movable die element for cutting the straight shank wire to a predetermined length, and means for shaping the cut straight shank wire into a loop.

6. A button loop forming mechanism, comprising vertically aligned relatively fixed and movable die elements, said dies having cooperating aligning parts, shelf means for positioning a button having a straight shank wire extending therefrom on said fixed die element, said positioning means including a laterally disposed stop for the button body, said movable die element including a forming element having a cutting portion and a shaping portion.

7. In a button loop forming mechanism, a vertically movable die element having an inner centering pin, a cutting element and a cylindrical shaping plunger, a fixed die element having an outer shell and an inner centering rod aligned with the centering pin, the outer shell and the inner centering rod being spaced to provide an annular channel to receive the shaping plunger, said centering pin having a reduced portion cooperating with the centering rod to form an annular recess around the reduced portion and between the aligned ends of the centering rod and the centering pin, and shelf means for positioning a button having a straight shank wire extending therefrom on said fixed die element, said shaping plunger having a helical shaping edge adapted to force a straight shank wire cut to size by the cutting element around said reduced centering pin portion into a loop.

8. In a button loop forming mechanism, a vertically movable die element having an inner centering pin, a cutting element and a cylindrical shaping plunger, a fixed die element having an outer shell and an inner centering rod aligned with the centering pin, the outer shell and the inner centering rod being spaced to provide an annular channel to receive the shaping plunger, said centering pin having a reduced portion and said centering rod having a depression to seat the lower end of the centering pin reduced portion to form an annular recess around the reduced portion and between the aligned ends of the centering rod and the centering pin, and shelf means for positioning a button having a straight shank wire extending therefrom on said fixed die element, said shaping plunger having a helical shaping edge adapted to force a straight shank wire cut to size by the cutting element around said reduced centering pin portion into a loop.

FIORENTINO ADAMO.

REFERENCES CITED

The following references are of record in the file of this patent:

UNITED STATES PATENTS

| Number | Name | Date |
|---|---|---|
| 390,118 | Ellery et al. | Sept. 25, 1888 |
| 459,376 | Gooding et al. | Sept. 8, 1891 |
| 496,472 | Beauregard | May 2, 1893 |
| 1,046,462 | Hall | Dec. 10, 1912 |
| 1,074,641 | Muller | Oct. 7, 1913 |
| 1,105,711 | Stockov | Aug. 4, 1914 |
| 1,526,716 | Neunherz | Feb. 17, 1925 |